Dec. 2, 1969  R. C. McKINLAY  3,481,117
ENGINE AIR SUPPLY SYSTEM
Filed May 31, 1968
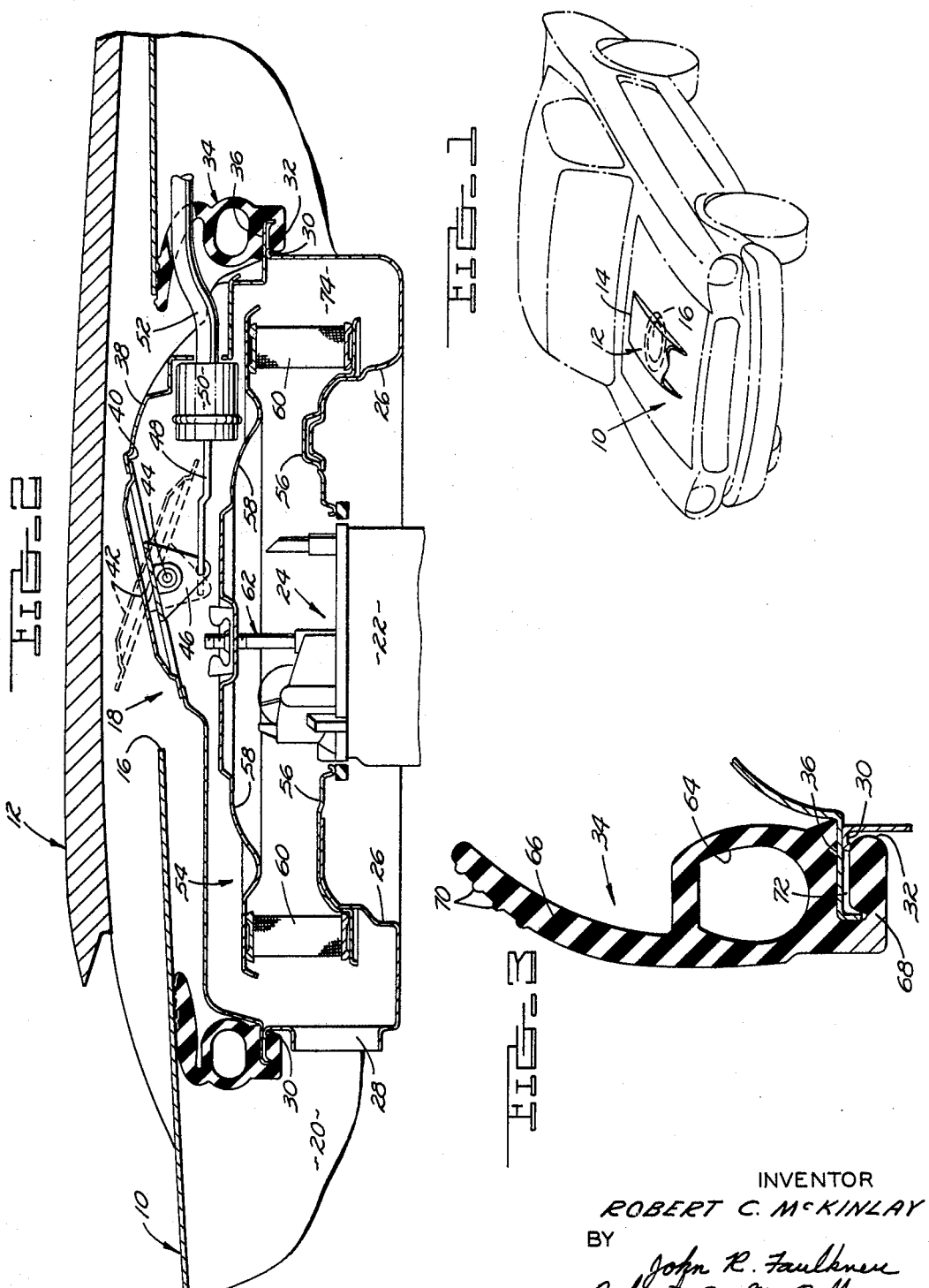
INVENTOR
ROBERT C. McKINLAY
BY
John R. Faulkner
Robert E. McCollum
ATTORNEYS

United States Patent Office 3,481,117
Patented Dec. 2, 1969

3,481,117
ENGINE AIR SUPPLY SYSTEM
Robert C. McKinlay, Dearborn, Mich., assignor to Ford Motor Company, Dearborn, Mich., a corporation of Delaware
Filed May 31, 1968, Ser. No. 733,456
Int. Cl. B01d 50/00
U.S. Cl. 55—385                                    7 Claims

ABSTRACT OF THE DISCLOSURE

An apparatus that supplies air to the engine of the motor vehicle from the vehicle engine compartment in a normal manner during idle and low load engine operating conditions; and, during full load automatically supplies a denser and greater volume of air from outside the vehicle.

---

This invention relates, in general, to a motor vehicle type internal combustion engine. More particularly, it relates to an apparatus that provides a supply of clean filtered air at varying densities to a motor vehicle engine, the density varying selectively in response to selected changes in engine operating conditions.

The total air flow through an engine air cleaner will vary as a function, for example, of the frictional resistance and drag on the air as it passes through the radiator and other parts of the intake system, the restriction caused by the size of the inlet to the air cleaner, the porosity of the filter element therein, and the various bends in the path of the flow resulting from the specific construction of the air cleaner per se.

Prior art devices are known in which, during low load and cold operating conditions of the engine, a restricted, heated air supply is provided to the engine, the air flow, however, being sufficient to satisfy engine requirements at this time. For performance, the latter devices provide an additional duct that opens to admit a less restricted volume of air from the engine compartment of the vehicle that subsequently combines with an increased flow of fuel into the carburetor. These latter prior art systems, however, are not completely satisfactory since the air in both cases, if it is warm, is essentially the same in density, thereby limiting the overall flow of air by weight into the carburetor.

The invention relates to an engine air supply apparatus providing two sources of clean filtered air for the carburetor of an engine, one of which supplies denser air from outside the vehicle to permit a greater combination by weight of fuel and air passing into the engine, thereby providing increased performance over known air supply systems.

More specifically, the invention provides an engine air cleaner assembly cooperating with an opening in the hood of a motor vehicle for intermittently supplying denser, outside air to the engine when engine performance requirements so dictate. During low load engine operating conditions, the carburetor is supplied in the normal manner with less dense air from the vehicle engine compartment.

It is an object of the invention, therefore, to provide an air supply system for an internal combustion engine having separate sources of air at varying densities selectively admitted to the engine as a function of the operating conditions of the engine.

It is another object of the invention to provide an engine air supply system consisting of an air cleaner assembly having a first air inlet communicating with the air in the engine compartment beneath the hood of a motor vehicle, and a second air inlet communicating through an aperture in the hood of the vehicle with cooler, denser air outside of the motor vehicle; the latter air being admitted to the engine upon the opening of a semi-automatically operated valve means.

Other objects, features and advantages of the invention will become more apparent upon reference to the succeeding detailed description thereof, and to the drawings illustrating a preferred embodiment thereof, wherein;

FIGURE 1 illustrates, isometrically, a motor vehicle, shown in phantom lines, having an engine air supply system embodying the invention;

FIGURE 2 shows a cross-sectional view of an engine air supply system embodying the invention; and, FIGURE 3 is an enlarged cross-sectional view of a detail in FIGURE 2 in a different operative position.

Many motor vehicles in operation today have an engine air supply system that includes an air cleaner located in the engine compartment of the vehicle over the inlet to the carburetor, the air cleaner having an air inlet communicating directly with the air in the engine compartment. This air is inducted through a radiator, into the air cleaner inlet, and then past a filter so as to provide a scheduled quantity of clean air into the engine to satisfy all operating conditions thereof. However, it will be clear that an air supply system of this type is not fully satisfactory for all operating conditions of the engine as a result of the large restriction to flow at the different engine speeds. The conventional air cleaner construction, therefore, is a compromise as a result of a need for designing it so as to satisfy fuel vapor emission control requirements, economical fuel consumption requirements, and yet provide the necessary performance to the engine when required.

The conventional air cleaner assembly generally has either a single air inlet snorkel, or an annulus, receiving engine compartment air at the temperature thereof, and, also, therefore, the density; or, alternately, a split intake system in which cool air first either is warmed by a shroud around the exhaust manifold before being inducted into the air cleaner, at low ambient temperatures, or if the air is sufficiently warmed, is taken directly into the air cleaner and the heated air supply shut off. It will be clear that with the latter system, air at essentially a fixed density is used to satisfy essentially all the flow requirements of the engine. In the former case, the initially cooler air does not satisfy exhaust emission requirements and is uneconomical insofar as fuel consumption is concerned.

It will be clear that, with a conventional downdraft type carburetor, performance of an engine is controlled not only by the total air flow passing through the carburetor, but also by the weight of the air; it will also be clear that if only warm engine compartment air is used as the air source, not as much will combine with fuel for a fixed volume to provide the burnable mixture as would a denser air. It will be equally clear that, during performance demands, if a cooler, denser supply of air be admitted to the carburetor inlet, more fuel can be combined with the air resulting in greater output performance of the engine.

The invention provides the selective operation of an air supply system as described above to supply the engine air supply system as described above to supply the engine air supply system as described above to supply the engine air supply compartment air to satisfy normal load requirements of the engine, while automatically supplying a denser flow and greater volume of air into the carburetor when engine performance and greater output are called for.

More specifically, FIGURE 1 shows in phantom lines a motor vehicle including a hood 10. The hood has an air scoop or shroud 12 secured thereon and consists essentially of an inverted channel member closed at the back portion 14. Directly beneath scoop 12 is an opening 16 in hood 10 for the passage of outside air directly into the engine air cleaner, in a manner to be described.

As best seen in FIGURE 2, an air cleaner assembly 18 is positioned directly beneath and cooperating with opening 16 in hood 10. The assembly automatically operates, in a manner to be described, to supply air to the engine either from the engine compartment 20 alone, or from both compartment 20 and the outside ram air admitted through scoop 12 and opening 16.

The motor vehicle engine (not shown) in this case has a known type of downdraft carburetor indicated in general at 22. It includes an air horn assembly 24 providing an air flow duct of a predetermined size for the flow of air into the carburetor and intake manifold of the engine. The hollow sheet metal housing of the air cleaner assembly 18, as shown, is sealingly mounted on and secured to air horn 24.

The air cleaner housing includes an essentially half doughnut shaped or annular pan like lower portion 26 that, at its leftward side, has a tubular like opening 28 for the admission of air from engine compartment 20. The upper outer periphery has an annular rolled or beaded edge 30 that sealingly engages the rounded edge 32 of a grooved portion of an annular rubber sealing boot 34. The edge 30 also engages the underside of an annular flange 36 that extends laterally from the air cleaner cover or upper housing portion 38 also into sealing engagement with boot 34.

Housing cover portion 38 includes an annular opening 40 that is opened and closed by the pivotal movement of a flap door or butterfly type valve 42. The latter has a balanced central pivotal mount on a shaft 44 fixed between the sides of the outer housing portion member. In this case, valve member 42 has a depending bracket 46 pivotally connected to a linear movable rod 48 of a known type of vacuum servo motor device 50. The latter is mounted to cover 38, and would contain a diaphragm secured to rod 48 and moved by spring pressure in one direction and in the opposite direction by vacuum in a tube 52. In this case, tube 52 is adapted to be connected to the intake manifold of the engine so as to be subject to the changes in vacuum therein to vary the opening and closing movements of flap valve 42.

The spring in servo motor 50, in the absence of vacuum in tube 52, will move rod 48 leftwardly to pivot flap door 42 clockwise. This will connect the openings 40 and 16 to admit dense ram air in hood scoop 12 to the air cleaner. When the vacuum in the intake manifold is high, as during low load conditions of operation of the engine, or at engine idle, the vacuum will overcome the spring force and maintain the flap door 42 in the full line, closed position shown.

Continuing with the description of the air cleaner assembly, a sub-assembly 54 is nested over the lower pan portion 26, and consists of a thin lower washer-like portion 56 and a thin upper disc- like secondary cover portion 58. Portion 56 overlies and engages pan portion 26, and is radially separated from cover 58 by an annular filter element 60. The latter can be of any known suitable construction, such as, for example, a pleated paper element. The sub-assembly is fixedly mounted to the carburetor air horn 24 by a bail and wing nut attachment 62.

FIGURE 3 illustrates more clearly a section of the annular boot or hood seal 34. It has a cored central section 64 to increase the flexibility, a plyable sealing annular lip portion 66, and an annular lip portion 68. The lip portion 66, has a number of annular ridges 70 providing a labyrinthian seal (FIGURE 2) to minimize leakage of air between the engine compartment 20 and air scoop passage 12. The lip portion 68 is defined by an annular groove 72 in which are seated the flange 36 and beaded edge 30.

FIGURE 2 shows the boot in installed position compressed so as to elastically force ridges 70 against the underside of hood 10 in a sealing manner.

OPERATION

The operation of the invention is believed to be clear from the above description and from a consideration of the drawings. In brief, however, when the engine is operating at low load conditions, such as during idling or part throttle, the level of the vacuum in the intake manifold of the engine will be high enough to overcome the force of the spring (not shown) in vacuum motor 50 and position the flap door 42 in the closed position shown preventing the entrance of cooler denser outside air into the air cleaner assembly. Accordingly, during these times, all of the air introduced into the engine will pass through the vehicle radiator and into the engine compartment and therefrom into air inlet 28 to flow around annular compartment 74 and pass through filter element 60 into the inlet in air horn 24 and therefrom into the carburetor proper. At this time, therefore, relatively warm air of essentially fixed density will be combined with the fuel in the carburetor to provide the engine operation called for.

When acceleration is demanded, such as by an essentially full or nearly full depression of the vehicle accelerator pedal, a sudden wider opeing of the throttle valve will decay the engine intake manifold vacuum to a low value, thereby permitting the force of the spring in vacuum motor 50 to push rod 48 to the left and pivot flap door 42 clockwise to its wide open position indicated in dotted lines. It will be clear that in this position the door will be substantially aligned with the direction of flow of ram air passing through the hood scoop 12, and therefore, that resistance to flow offered by the door 42 is minimized.

Accordingly, a large supply of ram air that is both cooler and denser than the air in engine compartment 20 will flow through the openings 16 and 40 into the annular space or manifold 74, and will pass through filter element 60 and into the inlet to the carburetor. Accordingly, the air being of greater volume (less restriction to flow) and denser than that conventionally taken into the engine compartment air inlet 28, a greater quantity of fuel can be combined with the air at this time so as to provide a greater output performance of the engine.

From the foregoing, it will be seen that the invention provides an engine air supply apparatus, which, during normal operation of the engine supplies all of the air to the engine from the vehicle engine compartment; and, that a supplemental cooler, denser and greater volume of ram air from outside the vehicle is added when the situation demands to permit the burning of a greater volume of fuel and thereby provide a greater output performance.

I claim:

1. An air supply system for the engine of a motor vehicle having a hood covering a vehicle compartment containing an engine, said engine having an intake manifold providing a source of vacuum varying as a function of the change in load on said engine, said supply system comprising, in combination, an annular air cleaner housing positioned in said compartment containing an air filter element therein and having first and second air inlet openings in said housing directing air through said filter, said first inlet being open at all times to air within the vehicle engine compartment for receiving a continuous supply of air therein at all times from within said vehicle compartment, said hood having an opening therein to the outside of said vehicle, said opening being operatively connected to and cooperating with said second air inlet for supplying to said housing at selected times an additional flow of (outside) air from outside said vehicle that is of normally different density than the air supplied to said first inlet, and spring opened movable power actuated valve means in said second inlet automatically movable from a position closing said second inlet towards an open position permitting the flow of said additional air of different density into said latter inlet in response to the attainment of high load conditions of operation of the engine of said motor vehicle.

2. An air supply system as in claim 1, said power actuated valve means including a vacuum motor connected to said valve means and having an operative connection to the intake manifold of said engine so as to be movable in response to predetermined high vacuum levels therein to move said valve means towards a closed position, and spring means biasing said valve means to an open position.

3. An air supply system as in claim 1, said valve means comprising a rotary pivotally mounted butterfly type valve, and a vacuum motor operatively connected to said valve.

4. An air cleaner assembly as in claim 1, including annular sealing means between said housing and the underside of said hood portion surrounding said opening and minimizing the leakage of said additional air into said compartment.

5. An air supply system as in claim 1, including ram air scoop means secured to said hood over said hood opening receiving ram air thereinto and directing said ram air into said hood opening.

6. An air supply system as in claim 1, said valve means including a pivotally mounted butterfly type valve, a vacuum motor having an operative connection to the intake manifold of said engine and movable by a predetermined level of the vacuum therein to move said valve means to a closed position, and spring means biasing said valve means to an open position.

7. An air system as in claim 6, said system also including seal means around said hood opening between the underside of said hood and said housing opening for maintaining separate the supplies of air to said first and second inlets, and ram air scoop means on said hood over said hood opening for directing said ram air into said hood opening and second inlet when said valve means is open.

References Cited

UNITED STATES PATENTS

| | | | |
|---|---|---|---|
| 1,448,008 | 3/1923 | Smith | 123—122 |
| 2,058,204 | 10/1936 | Ball et al. | 123—122 |
| 2,262,467 | 11/1941 | Ormsby | 180—54 |
| 2,398,094 | 4/1946 | Heymann | 123—122 |
| 2,430,759 | 11/1947 | Crise | 237—2 |
| 2,701,024 | 2/1955 | Thomas | 180—54 |
| 2,788,086 | 4/1957 | Sebok | 55—419 X |
| 2,808,893 | 10/1957 | Dorman et al. | 180—54 |
| 2,834,419 | 5/1958 | Sebok | 180—54 |
| 2,894,442 | 7/1959 | Hamilton | 180—54 |
| 3,249,172 | 5/1966 | DeLorean | 55—510 X |

FOREIGN PATENTS

| | | |
|---|---|---|
| 178,553 | 5/1954 | Austria. |

OTHER REFERENCES

Coles et al., Icing-Protection Requirement For Reciprocating-Engine Induction Systems, National Advisory Committee For Aeronautics, Technical Note 1993, December 1949, pp. 3, 4, 11, 12, 35, and 36.

HARRY B. THORNTON, Primary Examiner

D. E. TALBERT, Assistant Examiner

U.S. Cl. X.R.

55—419, 500, 502, 510; 48—180; 123—119, 122; 137—87, 479, 485, 560; 180—54; 251—28, 58, 279, 305, 337